Patented Dec. 5, 1922.

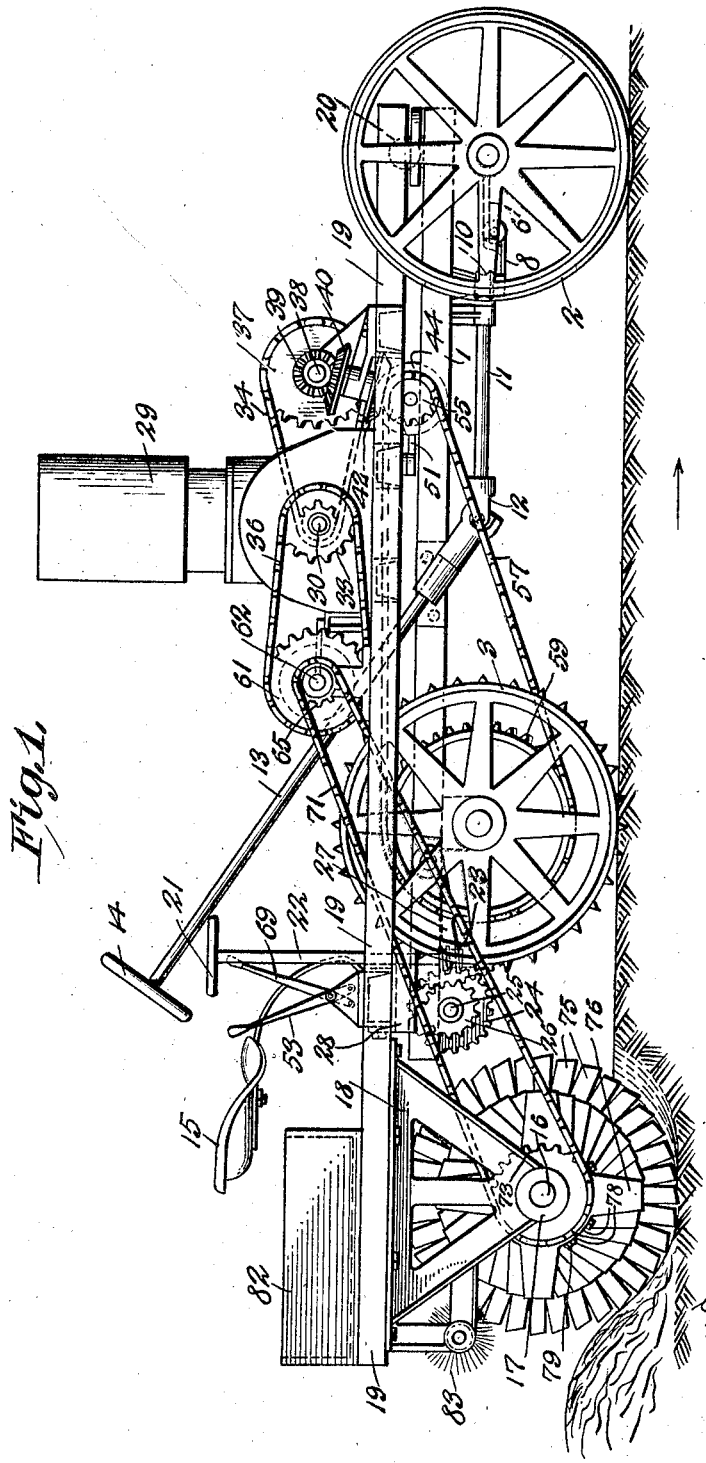

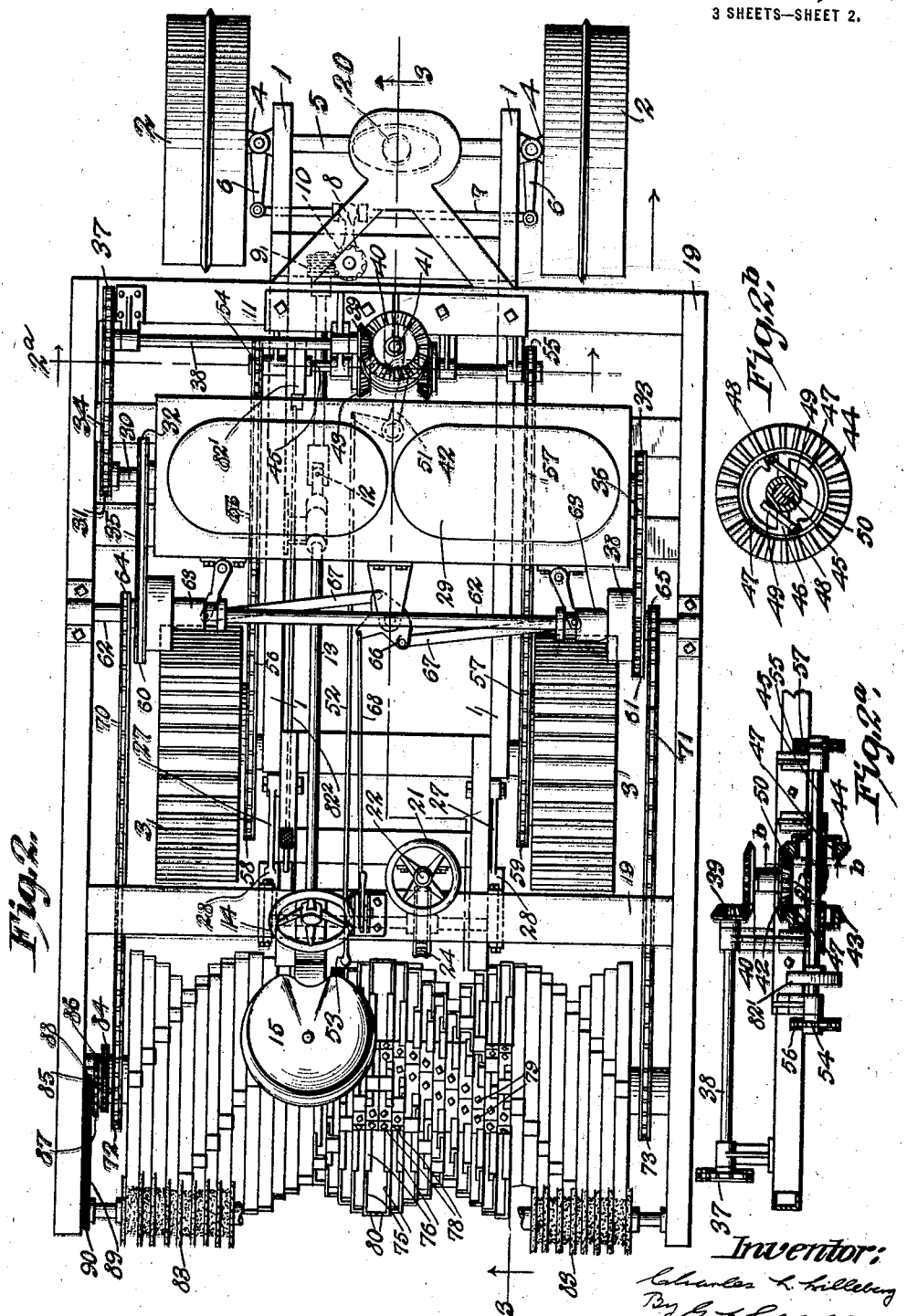

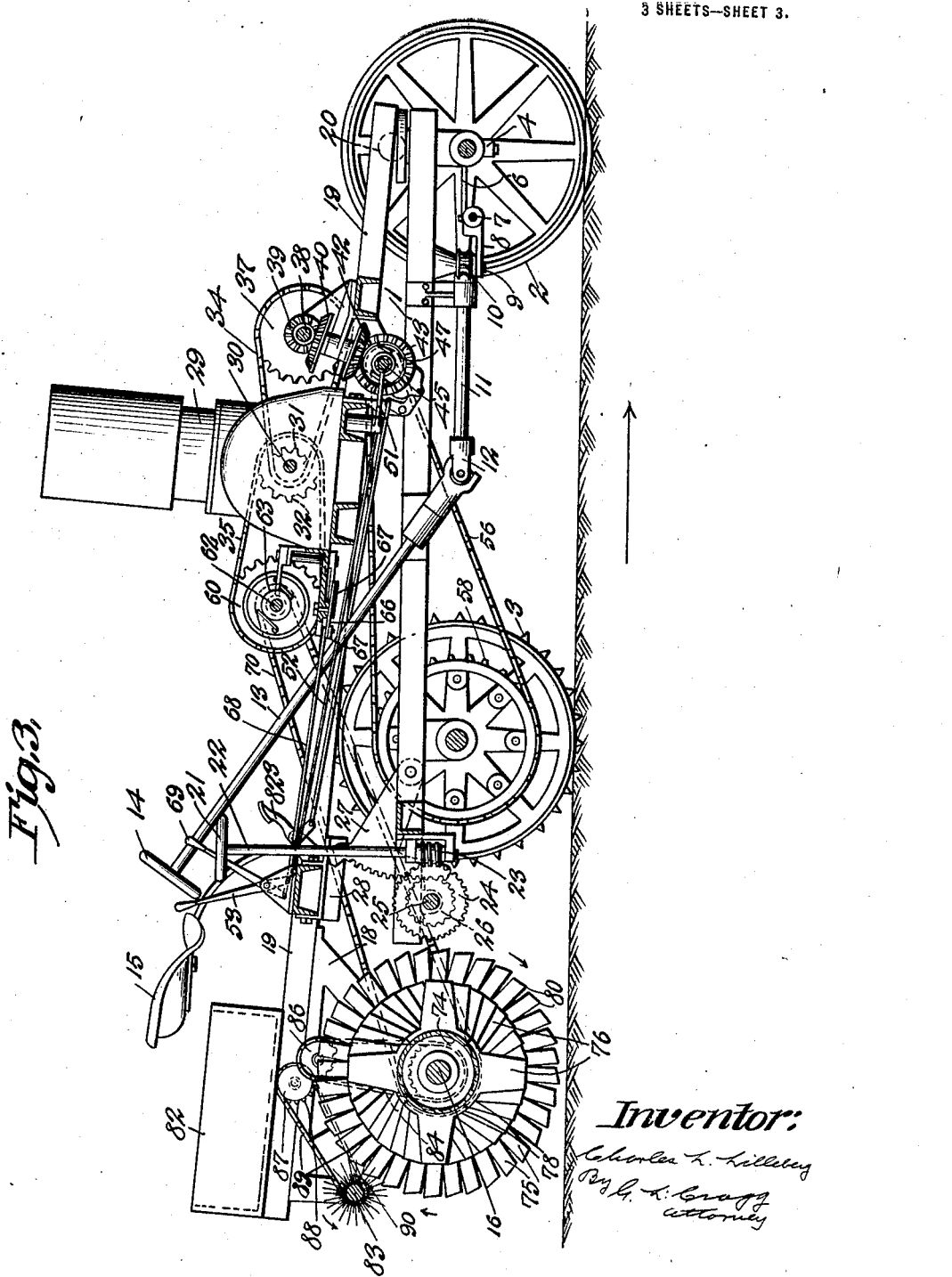

1,437,763

UNITED STATES PATENT OFFICE.

CHARLES L. LILLEBERG, OF CHICAGO, ILLINOIS.

ROTARY PLOW.

Original application filed June 28, 1917, Serial No. 177,479. Divided and this application filed March 13, 1919. Serial No. 282,282.

*To all whom it may concern:*

Be it known that I, CHARLES L. LILLEBERG, citizen of the United States, residing at Chicago, in the county of Cook and State of Illinois, have invented a certain new and useful Improvement in Rotary Plows, of which the following is a full, clear, concise, and exact description.

My invention relates to rotary plows and will be explained in all of its characteristics by reference to the accompanying drawings showing the preferred embodiment thereof and in which Fig. 1 is a side elevation of a plow constructed in accordance with the invention; Fig. 2 is a plan view of the construction shown in Fig. 1 excepting that some of the plow shares are not completely shown; Fig. 2ª is a detail illustrating some of the gearing; Fig. 2ᵇ is a sectional view on line *b—b* of Fig. 2ª; and Fig. 3 is a view on line 3—3 of Fig. 2.

Like parts are indicated by similar characters of reference throughout the different figures.

The structure of my invention includes a truck having an under frame 1 which is supported upon the forward vehicle wheels 2 and the rear vehicle wheels 3. The forward vehicle wheels 2 also constitute the steering wheels on which account they are mounted upon individual shafts 4 as in automobile practice, these shafts being journaled upon the outer ends of non-rotating axles 5 and having rearwardly extending fingers 6 which are joined at their rear ends by a steering bar 7. This steering bar is shifted laterally of the truck by means of a lever 8 that is operated by gearing 9, 10, the worm gear 9 being upon a shaft 11 connected by means of a universal joint 12 with the sloping steering shaft 13 upon whose upper end is provided the hand steering wheel 14. This hand steering wheel 14 is located in close proximity to the seat 15 provided for the operator.

The rotary plow, later more fully to be described, is mounted upon a shaft 16, here shown as being a rotating shaft. This shaft is journaled at its outer ends to rotate in bearings 17 carried at the lower ends of hangers 18 which are secured to and depend from the superframe 19. This superframe is located over the underframe and is joined with the underframe at the forward ends of these frames by means of the universal joint 20. The superframe is adjustable in a vertical plane upon the joint 20. The mechanism for adjusting the superframe upon the underframe includes a hand wheel 21 located adjacent the seat 15 (which seat is mounted upon the superframe 19), a shaft 22 upon whose upper end the wheel 21 is secured, a worm screw 23 fixed upon the lower end of the shaft 22, a worm wheel 24 in mesh with the worm screw, a shaft 25 (rotatably supported upon the rear end of the underframe 1) pinions 26 upon the shaft 25 and segmental racks 27 mounted to swing upon the underframe 1 and having their upper portions in engagement with the abutments 28 upon the bottom portion of the super frame 19. By turning the wheel 21 the racks 27 may be elevated or lowered causing corresponding elevation or depression of the rear end of the superframe, an adjustment which is permitted by the universal joint 20. The plow is operated by a suitable motor such as an internal combustion engine 29 upon whose shaft 30 are provided the operating gears 31, 32 and 33. These gears are desirably sprocket gears and respectively drive sprocket chains 34, 35 and 36. The sprocket chain 34 operates the sprocket wheel 37 fixed upon the outer end of a shaft 38. A bevel pinion 39 is fixed upon the inner end of the shaft 38 and is in mesh with a bevel gear wheel 40 that is fixed upon a short inclined shaft 41. A bevel gear wheel 42 is fixed upon the lower end of the shaft 41 and is in mesh with bevel gears 43, 44 that are themselves free of direct connection with the shaft 45. By this arrangement the bevel gears 43 and 44 also constantly rotate. These bevel gears are made hollow and the interior parts thereof are in the nature of clutch members. The shaft 45 carries a clutch member 46 for each bevel gear 43, 44 (Fig. 2ᵇ). This clutch member 46 has two spring arms 47. Each spring arm may be operated by a cam 48 provided upon a clutching dog 49. These clutching dogs may be spread apart by a collar 50 loose upon the shaft 45 to engage the corresponding spring arms with the corresponding bevel gear. This collar 50 may be moved toward either bevel gear 43 or 44, for the purpose of clutching, by a bell crank lever 51 having one arm thereof in pin and groove connection with the collar 50. An operating lever 52 connects the other arm of the bell crank 51 with the operating lever

53 that is adjacent the seat 15. By means of the lever 53 and the connections between it and the collar 50 this collar may be shifted from side to side along the shaft 45 to couple either the bevel gear 44 or the bevel gear 43 with the shaft 45 to cause the plow to go forwardly or backwardly. The collar 50 may also occupy a neutral position whereby both the gear wheels 43 and 44 may at the same time be out of driving connection with the shaft 45 for a purpose to be stated. This shaft 45 constitutes a jack shaft and carries upon its ends sprocket pinions 54, 55. These sprocket pinions mesh with sprocket chains 56, 57 that in turn mesh with sprocket wheels 58, 59 that are fixed with respect to and are co-axial with the vehicle wheels 3. The sprocket chains 35 and 36 drive sprocket wheels 60, 61 which are hollow to constitute these sprocket wheels clutching members having clutching action similar to that of the bevel gear wheels 43, 44, these sprocket wheels 60, 61 being free of direct connection with the shaft 62. Each sprocket wheel 60, 61 encloses a clutching member similar to the clutching member 46 (Fig. 2$^b$), and there is associated with each of these sprocket wheels a collar 63 acting similarly to the collar 50. By means of these collars 63 the sprocket wheels associated therewith may be brought into fixed connection with the shaft 62'. Sprocket pinions 64, 65 are fixed upon the shaft 62 and are driven by this shaft whenever the sprocket wheels 60, 61 are coupled with the shaft. The collars 63 are thrown simultaneously into and out of action by means of the walking beam lever 66 connected with the collars by the links 67. This walking beam lever is connected by a link 68 with the operating lever 69 located adjacent the seat 15. By the operation of this lever the clutching collars 63 are simultaneously thrown into or out of action whereby torque is applied to the ends of the shaft 62 or is removed therefrom. When torque is applied to the shaft 62 the sprocket pinions 64 are turned to drive the sprocket chains 70, 71 which in turn drive the sprocket wheels 72, 73 that are fixed upon the shaft 16. The drum 74 is co-axial with and is desirably fixed upon the shaft 16. This drum or rotatable support carries a plurality of sets of plow shares or knives 75 that may be revolved by the sprocket chains 70, 71. When the plow is to travel over the surface of the ground without plowing the same the superframe 19 is elevated as indicated in Fig. 3, at which time the walking beam lever 66 is adjusted to uncouple the sprocket wheels 60, 61 from the shaft 62, it being preferable not to rotate the plow shares while the plow is merely traveling over the ground.

The stems of the plow shares are assembled upon the radial supports 76. The bases 78 of the radial supports 76 are quadrants that are in the nature of shoes which fit upon the drum 74 and are fastened thereto by means of bolts 79. The shares or knives 75 are, as shown, angularly formed, the angularly related portions of each knife being desirably at right angles with respect to each other to present a right angle cutting edge 80. Each knife, as a whole, rotates in a vertical plane (the plane of rotation of drum 74) and the four knives of each set operate in the same plane. The sets of knives are arranged in serial order transversely of the plow and along the drum 74 and when these knives are to operate the sprocket wheels 60, 61 are thrown into connection with the shaft 62 and the superframe is gradually lowered until the knives are brought to the depth at which they are to operate in the soil. The swath cut by each set of knives is adjacent the swaths cut by the adjacent sets of knives. The outer angular ends of the knives, extending transversely of the plow, determine the width of the swaths. The inner radial cutting portions of the knives separate or cut apart the adjacent swaths. The adjacent sets of knives are in staggered relation so that the swaths cut by the adjacent and staggered knives of adjacent sets are commenced sequentially and finished sequentially. The four knives of each set together cut four tapering ribbons in each revolution of the drum 74

The wheels 3 are driven when the plow is operating, these wheels determining the advance that the plow may make and limiting the forward travel of the plow which the knives thereof effect to the exclusion of the wheels 3 (Fig. 1) when the plow is in operation, the wheels 3 being relied upon to cause the plow to travel only when the plow is not in operation, Fig. 3. The wheels 3 and the plow knives are operated simultaneously by the engine 29 and intervening gearing when the plow is in operation, the peripheral speed of the wheels 3 being materially less than the peripheral speed of the plow knives so that the wheels act as brakes to resist the advance of the plow knives to the extent which will enable and permit these knives to cut ribbons of soil of desired thickness.

When the plow is adjusted to be out of action, Fig. 3, the underframe 1 and the wheels 2 and 3 constitute parts of a motor vehicle and the plow with the superframe, etc., merely constitutes a load that may be transported by such motor vehicle. When the plow is adjusted to be in action, Fig. 1, the rotating body of plow knives, the superframe 19, and the forward vehicle wheels 20 constitute the motor vehicle to the exclusion of the wheels 3 which then serve merely as a regulating or governing check to the rate of progress of such motor vehicle. The tractive engagement of the plow, when the plow forms a part of the motor vehicle, is mainly due to the superframe 19 and the weight of the engine and other parts carried thereby which press down upon the rotating body of plow shares, this tractive engagement being reinforced by placing ballast in the box 82 to such an extent as to maintain the super frame 19 upon the upper ends of the segments 27. Not only is the tractive engagement of the rotating body of knives thus maintained but the depth to which the knives operate in the ground is fixed by the maintenance of the engagement between the superframe and the upper ends of the racks 27, the broad faced wheels 3 preventing the knives from going below the predetermined level and the ballast forcing these knives to reach this level in soils of varying consistency. In other words the plow knives will operate down to the same depth whether the soil is loose or hard, the ballast forcing it to seek this depth when the soil is hard, the wheels 3 and racks 27 co-operating to prevent the knives from going below this depth when the soil is soft.

In starting the rotary plow element into the ground the plow structure as a whole should be held substantially stationary until the plow has descended to a predetermined level which is preferably done by holding the wheels 3 from rotating. To this end I provide a brake $82^1$ for preventing the rotation of the shaft 45 when the collar 50 is in neutral position. This brake is operated by a brake rod $82^2$ connected with the bell crank pedal $82^3$ that is located adjacent the collar 50.

The knives are apt to take up the turf as they leave the surface of the ground and I remove this turf by means of a brush 83 which extends transversely of the plow at the rear thereof. This brush desirably has steel bristles which operate against the knives to remove the turf and other material therefrom whereby the knives are cleaned for the next operations that they are to perform. The brush 83 rotates oppositely to the direction of rotation of the knives and preferably at a higher rate of peripheral speed so as to have desired brush action. The bristles of the brush are of different lengths to reach different portions of the knives. The brush may be rotated by means of the sprocket gear 84, fixed upon the shaft 16, the sprocket chain 85, the pinion 86, the pinion 87 meshing with the pinion 86, the pinion 88 fixed with respect to the pinion 87, the sprocket chain 89, and the sprocket pinion 90 co-axial with and fixed with respect to the brush 83.

This application is a division of my original application Serial No. 177,479, filed June 28, 1917.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

1. A plow structure including a frame; a rotary plow element carried by this frame; wheels in supporting relation to the frame; means whereby the part of the frame carrying the rotary plow element may be adjusted up and down with respect to the wheels; a motor; driving connections between the motor and the rotary plow element and between the motor and some of the aforesaid wheels; and means for holding the plow structure substantially stationary when the rotary plow element is descending into the ground.

2. A plow structure including an underframe; wheels in supporting relation to the underframe; a superframe; mechanism for raising the superframe with respect to the underframe and holding it in its raised position; a rotary plow element upon the superframe; a motor carried by the superframe; and driving connections between the motor and the rotary plow element and between the motor and some of the aforesaid wheels.

In witness whereof, I hereunto subscribe my name this twentieth day of July, A. D. 1918.

CHARLES L. LILLEBERG.